United States Patent
Zhang

(10) Patent No.: US 7,644,173 B1
(45) Date of Patent: Jan. 5, 2010

(54) SYSTEM AND METHOD FOR FACILITATING EXPEDITED DELIVERY OF MEDIA CONTENT

(75) Inventor: Xinyan Zhang, Nanjing (CN)

(73) Assignee: Roxbeam Media Network Corporation, Tortola (VG)

( * ) Notice: Subject to any disclaimer, the term of this patent is extended or adjusted under 35 U.S.C. 154(b) by 668 days.

(21) Appl. No.: 11/235,644

(22) Filed: Sep. 26, 2005

(51) Int. Cl.
*G06F 15/16* (2006.01)

(52) U.S. Cl. ...................... 709/231; 709/219

(58) Field of Classification Search ................ 709/231, 709/236, 203, 225, 228; 725/50–59, 60–61
See application file for complete search history.

(56) References Cited

U.S. PATENT DOCUMENTS

| | | | | |
|---|---|---|---|---|
| 7,277,950 | B1* | 10/2007 | Chapweske | 709/227 |
| 7,373,413 | B1* | 5/2008 | Nguyen et al. | 709/231 |
| 2001/0027479 | A1* | 10/2001 | Delaney et al. | 709/216 |
| 2002/0120747 | A1* | 8/2002 | Frerichs et al. | 709/227 |
| 2002/0120752 | A1* | 8/2002 | Logan et al. | 709/228 |
| 2002/0138641 | A1* | 9/2002 | Taylor et al. | 709/231 |
| 2003/0212804 | A1* | 11/2003 | Hashemi | 709/228 |
| 2005/0262251 | A1* | 11/2005 | Klemets et al. | 709/230 |
| 2006/0080454 | A1* | 4/2006 | Li | 709/231 |
| 2006/0184688 | A1* | 8/2006 | Ganguly et al. | 709/232 |
| 2006/0288113 | A1* | 12/2006 | Saunders et al. | 709/231 |

OTHER PUBLICATIONS

Venkata N. Padmanabhan, Helen J. Wang, Philip A. Chou (Microsoft Research) and Kunwadee Sripanidkulchai (Canergie Mellon University)- Distributing Streaming Media Content Using Cooperative Networking—May 12-14, 2002, ACM pp. 177-186.*
W. R. Stevens, "TCP/IP Illustrated," vol. 1, Ch. 1 et seq., Addison-Wesley (1994).
X. Zhang et al., "Coolstreaming/DONet: A Data-driven Overlay Network for Peer-to-Peer Live Media Streaming," INFOCOM 2005, 24th Ann. Jt. Conf of the IEEE Comp. and Comm. Societies, Proc. IEEE vol. 3, 13-17, pp. 2102-2111 (Mar. 2005).
A. Tanenbaum, "Computer Networks," Ch. 1 et seq., Prentice Hall (2002).
Zhang, Xinyan et al., "CoolStreaming/DONet: A Data-Driven Overlay Network for Efficient Live Media Streaming", pp. 1-14, http://www.cs.sfu.ca/~jcliu?Papers?CoolStreaming.pdf, downloaded Nov. 25, 2008.

* cited by examiner

*Primary Examiner*—Joseph E Avellino
*Assistant Examiner*—Catherine Thiaw
(74) *Attorney, Agent, or Firm*—Park, Vaughan & Fleming LLP

(57) ABSTRACT

One embodiment provides a system and method for facilitating expedited delivery of media content to a node over a network. During operation, the system communicates a request to a media server to present media content. The system then presents the media content based on the data received from the media server. In addition, the system communicates requests to a plurality of peer nodes within the network for the media content at a same proximate time. Next, the system discontinues receipt of data from the media server and presents the media content based on data received from at least one peer node without significant interruption in presentation.

10 Claims, 5 Drawing Sheets

SYSTEM AND METHOD FOR FACILITATING EXPEDITED DELIVERY OF MEDIA CONTENT

FIELD OF THE INVENTION

The present invention relates to techniques for delivering media content over networks. More specifically, the present invention relates to a system and a method for facilitating expedited delivery of media content with reduced content-switching time.

BACKGROUND OF THE INVENTION

Presently, the ubiquity of Internet connectivity and an unprecedented growth in data communications access bandwidth has been fueling the demand for more versatile forms of on-line content. In particular, there has been an increasing demand for multi-media content, such as audio and video. Existing Internet applications have yet to provide effective delivery of bandwidth-intensive multi-media content to end-users.

Currently, video is one of the most bandwidth-demanding forms of on-line content. Traditionally, video, particularly live video, as well as audio, have been broadcast over cable programming networks. As a result, bandwidth-demanding video signals, such as TV channels, have only been offered to end-users by the cable programming networks. Although broadband cable service can provide both digital data and cable programming to end-users, cable programming is often provided on cable media that is physically separate from the cable media used for providing Internet connectivity, such as DSL or Ethernet network services. End-users are not able to enjoy audio or video content over broadband cable networks that offer only Internet connectivity and not cable programming.

Delivering video content over an Internet connection hinges upon several constraints. Traditionally, access bandwidth has presented one bottleneck. For example, dial-up Internet services generally limit access bandwidth to 56 Kbps. Fortunately, recent developments in access technologies, such as ADSL, VDSL, direct Ethernet connection, and WLAN, have largely removed this bottleneck by bringing multi-Mbps connections to end-users. Despite these advances, server overloading and network congestion still pose potential constraints.

Conventionally, media content is delivered based on a client-server model. An end-user starts a client program, which contacts a server where the content is stored and downloads the content from the server. Although the end-user's Internet connection may provide sufficient bandwidth to accommodate one or more video channels, the server may be overloaded if a large number of other end-users are simultaneously requesting streaming video. In addition, the connection between the server and the network may be congested with other network traffic. High-performance servers and high-bandwidth network connections can mitigate these problems, but such solutions inevitably increase the costs of providing Internet service to the end-users.

Recently, peer-to-peer (P2P) overlay networks have attracted growing interest as one possible solution. A P2P network is typically formed as a logical layer operating over a conventional network infrastructure, such as implemented in the Internet. In a P2P network, peer machines are aware of the states of other peer machines and a group of peer nodes can directly exchange data or services among themselves. The task of content delivery is not undertaken by one particular server. Thus, P2P networks provide a favorable environment for delivering streaming data, such as video, because server overloading is avoided and network congestion is reduced.

Nevertheless, reducing content-switching time remains a key challenge in P2P content delivery. Typically, a peer machine first gathers information about the other peer nodes that store the media content. Next, the peer machine contacts selected peer nodes and requests the content. Once received, the peer machine often stores the content into a buffer before presenting the content with, for example, media-content presentation software, such as a media player. The process can consume significant time. For example, up to one minute may be needed to switch channels when viewing television (TV) programs delivered as streaming video over a P2P network. The experience can be frustrating for end-users accustomed to the fast channel-switching time afforded by cable programming networks.

Hence, there is a need for a system and a method for facilitating expedited content delivery with reduced content-switching time.

SUMMARY OF THE INVENTION

One embodiment provides a system and method for facilitating expedited delivery of media content to a node over a network. During operation, the system communicates a request to a media server to present media content. The system then presents the media content based on the data received from the media server. In addition, the system communicates requests to a plurality of peer nodes within the network for the media content at a same proximate time. Next, the system discontinues receipt of data from the media server and presents the media content based on data received from at least one peer node without significant interruption in presentation.

A further embodiment provides a system and method that reduces channel-switching time for audio and video content delivered via a peer-to-peer overlay network. During operation, the system transmits requests to a media server and a plurality of peer nodes for the audio and video content. The system then receives and buffers data for the audio and video content from the media server via a UDP port and from one or more peer nodes. The initial data from the media server may be delivered at a higher data rate and hence facilitates a reduced buffering time. While receiving and buffering data from the peer nodes, the system presents the audio and video content based on the buffered data received via the UDP port, thereby allowing a shorter channel-switching time. In addition, the system terminates data transfer from the media server and continues presenting the audio and video content based on the buffered data.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Delivery of TV Signals Over Cable Programming Networks

Figure 1:
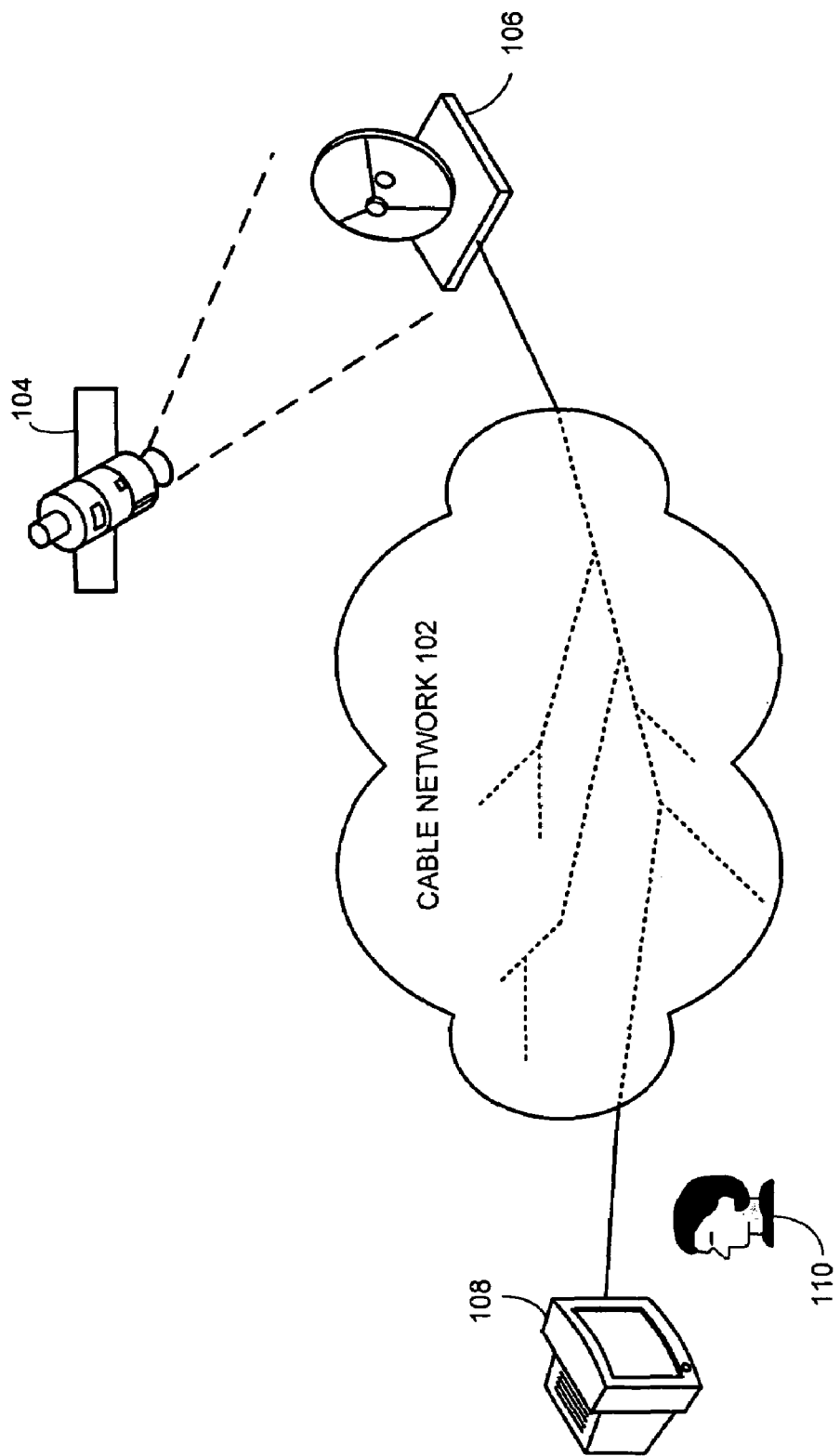
FIG. 1 illustrates a prior art conventional cable programming network, which is used to deliver TV signals to end-users.

FIG. 1 illustrates a prior art conventional cable programming network 102 for delivering TV signals to end-users. The head-end of a cable programming network 102 is in communication with a satellite base station 106. Base station 106 receives signals for several TV channels relayed by a satellite 104. Base station 106 also encodes the received TV signals and transmits the signals onto the cable programming network 102.

Cable network 102 can be implemented over a conventional coaxial-cable network, or in a further embodiment, can be an optical-fiber network. At the user-end, the TV signals are typically carried by a copper coaxial cable that is routed to an end-user's residence or office. A TV set or receiver 108 receives the TV signals and presents the media content.

Cable networks are usually implemented in tree topologies to facilitate transmitting traffic downstream from the head-end to the tail-end. A coaxial cable can accommodate several TV channels simultaneously due to the large bandwidth available. In contrast, accommodating the simultaneous transmission of multiple TV channels over an Internet connection can be difficult due to significantly smaller available bandwidth.

Currently, Internet services are offered by Internet service providers (ISPs) over broadband cable networks, which are capable of offering significant downstream bandwidth. Other types of cable networks are possible. Nevertheless, due to the tree topology of cable networks, upstream bandwidth is shared by multiple Internet users and is limited on a per-user basis. Furthermore, although TV signals and Internet traffic can be carried over the same physical medium, the signals are transmitted independently. As a result, TV signals are usually unavailable in cable networks offering only Internet connectivity.

Expedited P2P Media Streaming

P2P networks have emerged as one effective solution to distributing objects that require significant network bandwidth and resources, such as audio or video files. In particular, a P2P network can be used to deliver bandwidth-demanding streaming media by operating as a logical layer over an existing network infrastructure, such as the Internet or a wireless cellular network. A node in a P2P network not only requests and receives data from other peer nodes, but also contributes any data locally stored with the other peer nodes. Thus, P2P-based content delivery system can avoid potential server overload and network congestion by distributing content among peer nodes.

P2P streaming technologies allow more efficient bandwidth utilization. However, a long delay can often occur when a user switches from one stream of media content to another. The delay can be as long as 60 seconds and can significantly impair the user experience. The delay occurs as a result of a lengthy P2P session initialization process, during which a node learns the states of peer nodes and performs necessary scheduling for subsequent data transfer.

In a P2P network, nodes are often free to join and leave the network. In addition, data stored by a node can vary over time. To start receiving streaming data providing new content, such as a different TV channel, a node typically first determines the states of peer nodes and obtains a list of candidate peer nodes from which the node can receive the new content. The node may obtain this information from, for example, a directory server. The node can alternatively probe peer nodes and perform any scheduling necessary for completing a subsequent data transfer. Once the data transfer commences, additional delays for the buffering the data may be necessary before the content can be presented to the user. Probing, scheduling, and buffering can often involve lengthy delay, which can be frustrating to end-users accustomed to negligible TV channel-switching times.

One embodiment significantly reduces content-switching time by combining one-to-one data transfers, such as transfers based on a client-server model, and P2P data transfer initiation processing. During operation, a peer machine commences the initiation process for a P2P data transfer and, at the same approximate time, also sends a request to a designated server or node requesting immediate download of the beginning segments of the media content. The requests to initiate the P2P and one-on-one data transfers need not be absolutely simultaneous, but should both be sent within a short time frame to ensure overlap between the requests, thereby providing the end-user with a more immediate content-switching experience. As the initiation of a one-to-one data transfer is often faster than the initiation of a P2P data transfer, the peer machine can begin presenting the media content with less delay. Although described with reference to media content providing TV programming, the media content could equally provide other forms of video or audio data, as well as other types of media content providable over a data stream.

Figure 2:
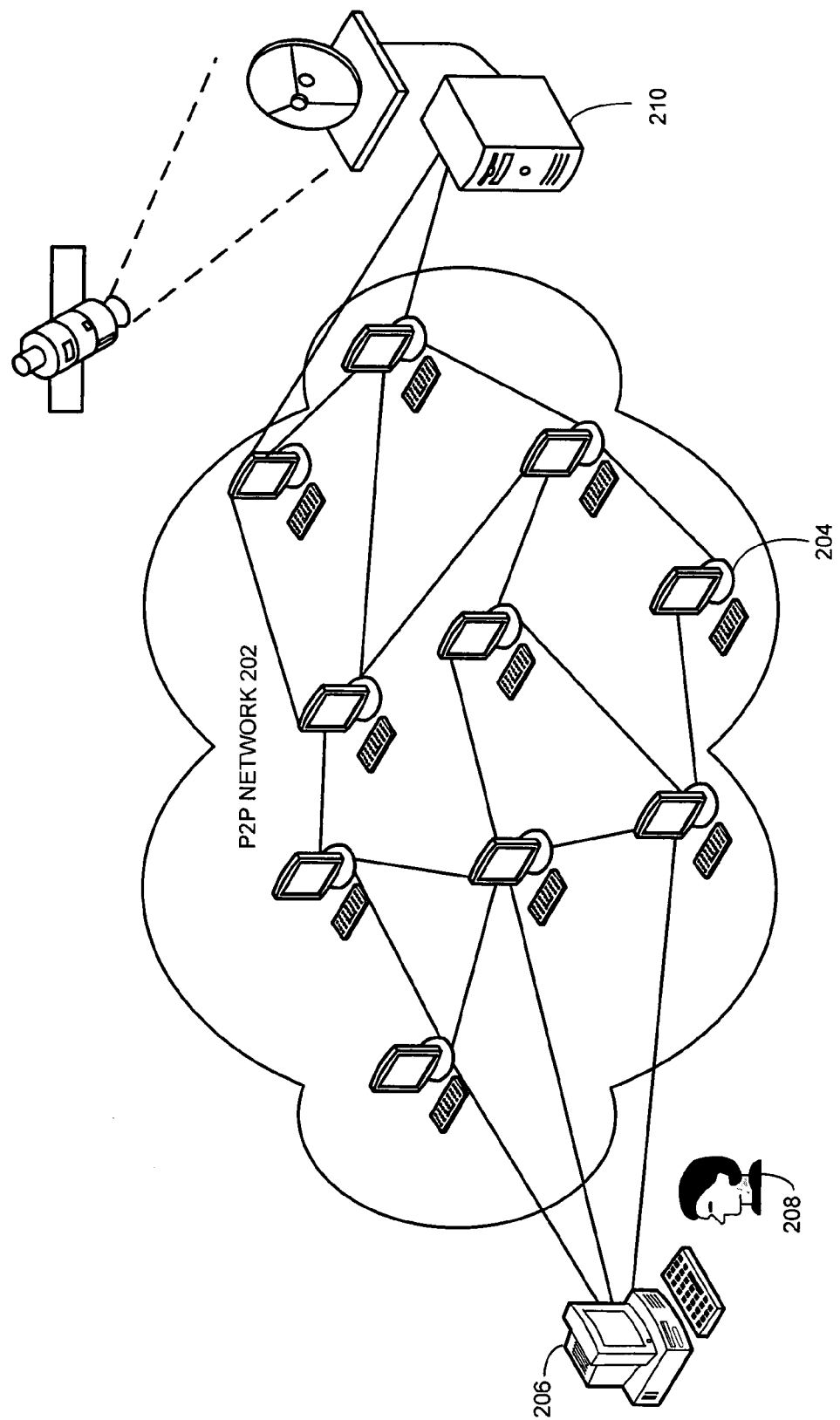
FIG. 2 illustrates a P2P network, which combines one-to-one data transfer and P2P streaming to reduce content-switching time, in accordance with one embodiment.

FIG. 2 illustrates a P2P network, which combines one-to-one data transfer and P2P streaming to reduce content-switching time, in accordance with one embodiment. A server 210 is in communication with a satellite base station and receives data for media content. Peer nodes, such as computer 204, form a P2P overlay network 202. The P2P network 202 can be formed as a logical layer over an underlying network infrastructure, such as the Internet or a wireless cellular network, which is implemented in accordance with the Transmission Control Protocol/Internet Protocol (TCP/IP), such as described in W. R. Stevens, "TCP/IP Illustrated," Vol. 1, Ch. 1 et seq., Addison-Wesley (1994), the disclosure of which is incorporated by reference. Other network infrastructures are possible.

A P2P overlay network is formed using widely-available conventional one-to-one unicast links. A one-to-one link is a point-to-point or end-to-end connection between two nodes in a packet-switched network implemented, for instance, using TCP/IP, although other network implementations or protocols are also possible. By comparision, IP multicast, which also operates in a packet-switched network implementation, offers similar utilitization of existing network infrastructure, but support for IP multicast remains limited due to practical reasons, such as a lack of incentives for service providers to install multicast-capable routers. P2P overlay networks provide an application-level solution, which implement the network using unicast tunnels across cooperative participating nodes, called overlay nodes. thus, an overlay network can provide multicasting by relaying data among the overlay nodes. An exemplary implementation of an overlay node is described in X. Zhang et al., "Coolstreaming/DONet: A Data-driven Overlay Network for Peer-to-Peer Live Media Streaming," INFOCOM 2005, 24th Ann. Jt. Conf. of the IEEE Comp. and Comm. Societies, Proc. IEEE Vol. 3, 13-17, pp. 2102-2111 (March 2005), the disclosure of which is incorporated by reference.

During operation, server 210 sends data for the media content to neighboring nodes, which are in communication with other peer nodes. The media content can pass from node-to-node via communication links to propagate to end host 206, which then presents the received media content to an end-user 208.

When end host 206 receives a command to switch the streaming media content from user 208, the end host 206 initiates a P2P session with peer nodes and buffers received P2P data once the data transfer begins. At the same approximate time, the end host 206 also initiates a User Datagram Protocol (UDP) data transfer session with the server 210 and starts buffering received data. UDP is a connection-less transport protocol, which provides no re-transmission of dropped packets. UDP is typically suitable for broadcast communications due to the low overhead needed to support this protocol. Although described with reference to a UDP session, end host 206 can use any transport-layer protocol, such as the Transport Control Protocol (TCP) or a proprietary protocol, to accomplish one-to-one data transfer. The communications between end host 206 and server 210 can be based on a client-server model, or more generally, a one-to-one model. Exemplary implementations of client-server communications are described in A. Tanenbaum, "Computer Networks," Ch. 1 et seq., Prentice Hall (2002), the disclosure of which is incorporated by reference. In addition, the end host 206 can establish a UDP session with a node other than the server 210 within the network, which stores the necessary data.

After the end host 206 has buffered sufficient UDP data to begin presenting the content to the end-user, the end host 206 starts presenting the media content and, at the same approximate time, continues buffering data received through the P2P session. When sufficient P2P data is buffered and the aggregate data transfer rate from the P2P peer nodes stabilizes at a level that can sustain smooth media content presentation, end host 206 terminates the UDP session. Meanwhile, end host 206 continues presenting the media content to the user. Generally, the transition from a UDP session to a P2P session is immediate and therefore the end-user 208 usually does not notice any difference in the media content presented.

Although the initial UDP-based data transfer significantly reduces the total content-switching time, buffering the UDP data can still cause delay. To mitigate this delay, one embodiment allows the end host 206 to play a separate media clip while the UDP data is being buffered. Thus, the end-user can immediately receive a different media stream after issuing a switching command, although the media clip might be different from the actual real-time streaming media eventually delivered. The separate media clip can be a locally stored file, or in a further embodiment, can be downloaded from the network.

Figure 3:
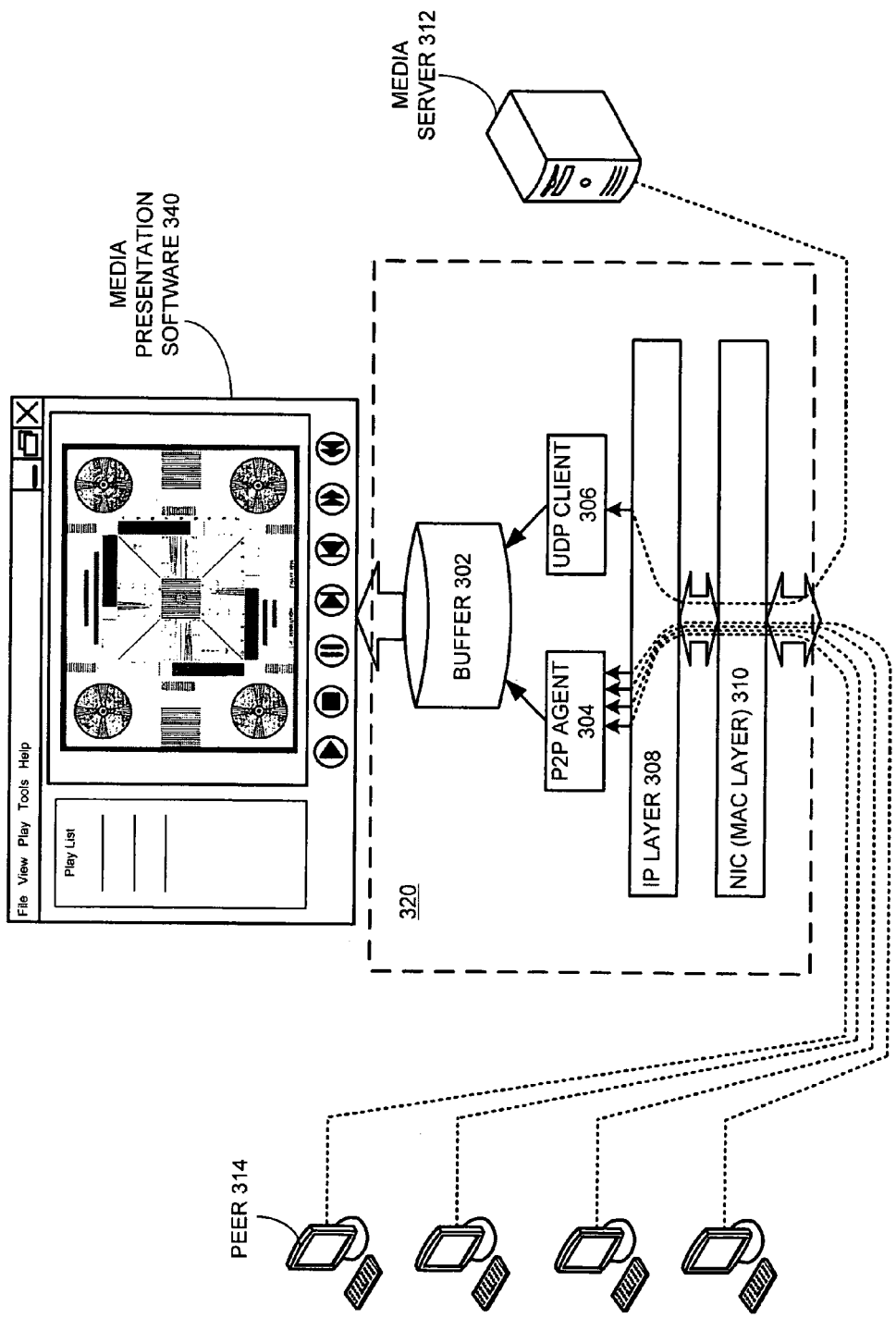
FIG. 3 presents a block diagram illustrating an exemplary architecture for reducing content-switching time, in accordance with one embodiment.

FIG. 3 presents a block diagram illustrating an exemplary architecture for reducing content-switching time in accordance with one embodiment. In this example, an end host system 320 includes a network interface card 310, which operates on the Medium Access Control (MAC) layer, and an Internet Protocol (IP) layer 308, which is responsible for handling all the incoming and outgoing IP packets. The end host 320 also includes a P2P agent 304 and a UDP client 306. When the end host 320 receives a user command to switch media content, such as switching TV channels, the P2P agent 304 initiates a P2P session with multiple peer nodes, such as peer node 314, based on peer node state information to request data providing the new media content. Subsequently, the P2P agent 304 starts receiving the data from the peer nodes and stores the received data in a buffer 302.

At the same approximate time, the UDP client 306 initiates a UDP session with a media server 312 to request data providing the new media content as streaming data. Upon receiving the data from the media server 312, the UDP client 306 stores the received data in the buffer 302. Media presentation software 340 can start presenting a separate media clip (not shown) after receiving the content-switching command while data from the UDP session is received into the buffer 302. Once sufficient data is buffered, the media presentation software 340 stops presenting the separate media clip and starts presenting the streaming media content based on the data stored in buffer 302. Media server 312 can be a dedicated media server or a network node, which stores the required data.

Both the P2P agent 304 and the UDP client 306 store the received data in the same buffer 302. While the media presentation software 340 is presenting the streaming media content received in the UDP session by drawing data from the buffer 302, the P2P agent 304 continues with the data transfers from the other peer nodes. When sufficient data from the P2P sessions has been buffered and the aggregate data transfer rate reaches a level sufficient to sustain smooth playback, the UDP client 306 stops the UDP session. Subsequently, only data received through the P2P session is stored in the buffer 302. From an end-user's perspective, the transition is unnoticeable because the media presentation software 340 draws data from a common buffer. Hence, by using a UDP session to obtain the initial data for the new media content, the system can significantly reduce the content-switching delay as perceived by the end-user.

Figure 4:
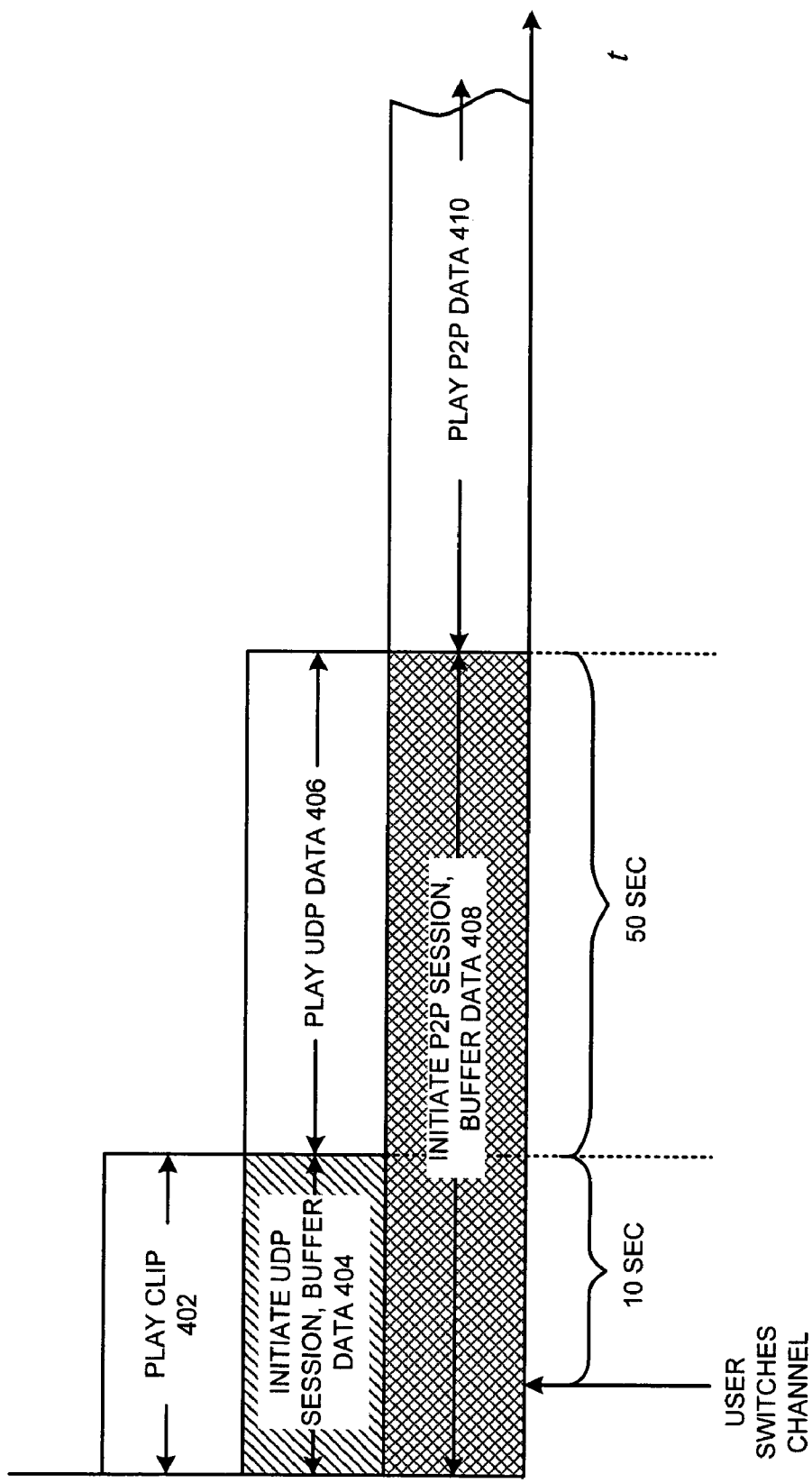
FIG. 4 presents a time diagram illustrating an exemplary process of expedited P2P content switching, in accordance with one embodiment.

FIG. 4 presents a time diagram illustrating an exemplary process of expedited P2P content switching, in accordance with one embodiment. Upon receiving a user command to switch media content, an end-host system starts presenting a media clip (step 402). The end-host system also initiates a UDP session by requesting streaming data for the new media content and buffers the data subsequently received through a UDP port (step 404). At the same approximate time, the system initiates a P2P data transfer session by requesting data for the new media content and buffers the data received through the P2P session (step 408).

When sufficient data from the UDP session has been buffered, the system stops presenting the media clip and begins presenting the streaming media content based on the data received through the UDP session (step 406). In the example described with reference to FIG. 4, the duration of the playback of the data buffered in the UDP session is ten seconds. Other durations are possible. For example, the buffering time can be reduced to three seconds and the system configures the buffering time to match the amount of buffering desired by the user.

After the system has buffered data through the P2P session sufficient to enable smooth playback, the system stops the UDP data transfer and continues presenting the streaming media content, which is now based on the data received through the P2P session (step 410). This transition occurs when the system has attained a sufficient aggregate data transfer rate through the P2P session. If the P2P session cannot provide a sufficient aggregate data transfer rate, for example, due to a small number of peer nodes with the requested content or due to network congestion, the UDP session may continue operating until the system attains sufficient a aggregate P2P data transfer rate. In a further embodiment, the system stops the UDP session after a pre-determined period of time. In the example described with reference to FIG. 4, the system stops the UDP session after presenting the data for 50 seconds.

On the other hand, if the UDP session cannot provide a sufficient data rate for the initial presentation of the media content, for example, due to server overload, the system may stop the UDP session after a pre-determined time and may subsequently rely on data received through the P2P session. If neither the UDP session nor the P2P session can attain sufficient data transfer rates, the system may notify the user and exit. In a further embodiment, the system may reduce the required data transfer rate and present the media content at a lower bit rate. In the case of video content, playback at a lower bit rate may result in a lower resolution.

As a P2P session can require a user-perceptible amount of time to initiate, the playback time corresponding to the UDP session will allow the P2P session with additional time to initiate and attain a sufficient aggregate data transfer rate without causing a delay noticeable to the user. The UDP playback time can be configured based on system requirements and network conditions. For example, if the peer machine initiating the P2P session is able to quickly locate multiple peer nodes storing the requested content, a sufficient aggregate data transfer rate can be quickly attained and the system may only require a short UDP session. Otherwise, the system may allocate more time for the UDP session as necessary. In addition, the system may tune the UDP playback time according to certain performance metrics, such as memory or processor usage.

Although the foregoing processes help to facilitate reduced content-switching time, the processes can also apply in other situations presenting, for instance, an interruption in content delivery, where the system needs to recover from the interruption and resume presenting the media content. For example, if, after a system switches to a P2P data transfer, the P2P session fails and the system needs to restart the data transfer, the system may use variations of the same processes used for content-switching.

Figure 5:
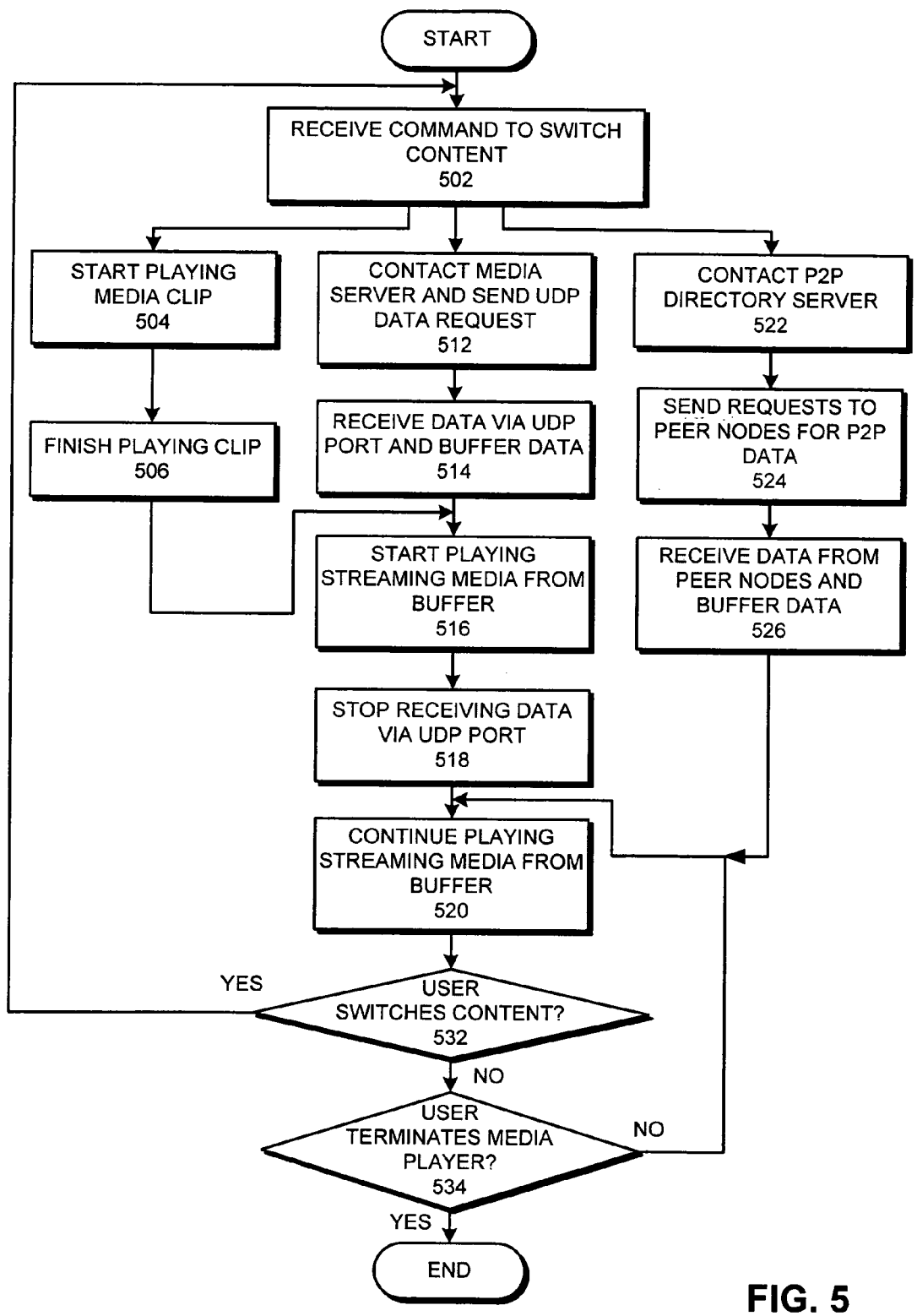
FIG. 5 presents a flow chart illustrating an exemplary process of expedited P2P content switching, in accordance with one embodiment.

FIG. 5 presents a flow chart illustrating an exemplary process of expedited P2P content switching, in accordance with one embodiment. During operation, the system starts by receiving a user command to switch content (step 502). The system subsequently begins three processes in parallel.

In a first process, the system starts playing a media clip, which can be stored locally (step 504). After a given period of time during which the data from the UDP session is buffered, the system stops playing the clip (step 506) and begins playing the streaming media content from the P2P session that is the buffer (step 516).

In a second process, the system first contacts a media server and sends a UDP data request (step 512). The system then begins to receive data via a UDP port and buffers the received data (step 514). After data sufficient for smooth playback has been buffered, the system starts playing streaming media content from the buffer (step 516). After a given period during which the P2P session is in progress and data is being received and buffered, the system terminates the UDP session and stops receiving data via the UDP port (step 518). The system continues playing streaming media content from the buffer (520).

In a third process, the system first contacts a P2P directory server and obtains state information of candidate peer nodes from which the system can request relevant streaming data for the media content (step 522). The system sends data requests to each candidate peer node (step 524). The system subsequently receives data from the peer nodes and buffers the received data (step 526). After data sufficient for smooth playback has been buffered, the system terminates the UDP session and keeps playing the streaming media from the buffer (step 520).

While playing the media content, the system also detects whether a user again is switching content. The system repeats the content-switching process by performing step 502. Otherwise, the system determines whether the user is closing the media player (step 534) and exists. Otherwise, the system continues playing the media content (step 520).

While the invention has been particularly shown and described as referenced to the embodiments thereof, those skilled in the art will understand that the foregoing and other changes in form and detail may be made therein without departing from the spirit and scope of the invention.

What is claimed is:

1. A method for facilitating expedited delivery and continuous presentation of media content to a node over a network, the method comprising:
   a computing device communicating requests to a plurality of peer nodes within the network for the media content;
   buffering the data received from the peer nodes after communicating the requests to the peer nodes;
   communicating a request to a media server to present media content at the same time as when the requests are communicated to the peer nodes;
   buffering the data received via a User Datagram Protocol (UDP) from the media server after communicating the request to the media server;
   presenting a separate media clip while the data received from the media server is being buffered;
   presenting the media content based on the UDP data received from the media server after presenting the separate media clip, while the data received from the peer nodes is being buffered, wherein the UDP data playback time is configurable depending on system requirements and network conditions; and
   discontinuing receipt of data from the media server and presenting the media content based on data received from at least one peer node without significant interruption in presentation;
   wherein discontinuing receipt of data from the media server involves terminating data transfer from the media server after the aggregate data rate of the data received from the peer nodes reaches a pre-determined level.

2. The method of claim 1, further comprising receiving the separate media clip from a node within the network.

3. The method of claim 1, wherein the separate media clip is stored locally.

4. The method of claim 1, wherein discontinuing receipt of data from the media server involves terminating data transfer from the media server after a given period of time has elapsed since the request is communicated to the media server.

5. A method for reducing channel-switching time for audio or video content delivered via a peer-to-peer overlay network, the method comprising:
- a computing device transmitting requests to a media server and a plurality of peer nodes for the audio or video content;
- receiving and buffering data for the audio or video content from the media server via a UDP port and from one or more peer nodes, whereby initial data from the media server may be delivered at a higher data rate and hence facilitates a reduced buffering time;
- presenting a separate media clip while waiting for sufficient UDP data to be buffered;
- while receiving and buffering data from the peer nodes, presenting the audio or video content based on the buffered data received via the UDP port, thereby allowing a shorter channel-switching time, wherein the UDP data playback time is configurable depending on system requirements and network conditions;
- terminating data transfer from the media server; and
- continuing presenting the audio or video content based on the buffered data.

6. The method of claim 5, wherein prior to transmitting requests to the peer nodes, the method further comprises obtaining from a directory server a list of peer nodes which contain data for the audio or video content.

7. A system for facilitating expedited delivery of media content to a node over a network, the system comprising:
- a P2P communication mechanism configured to communicate requests to a plurality of peer nodes within the network for the media content;
- a buffer configured to buffer the data received from the peer nodes after the communication mechanism communicates the requests to the peer nodes;
- a UDP communication mechanism configured to communicate a request to a media server to present media content at the same time as the requests are communicated to the peer nodes;
- the buffer further configured to buffer the data that the second communication mechanism receives via a UDP port from the media server after the UDP communication mechanism communicates the request to the media server;
- a media-content presentation mechanism configured to:
- present a separate media clip while the data received from the media server is being buffered;
- present the media content based on the UDP data received from the media server, while the data received from the peer nodes is buffered,
- after presenting the separate media clip, wherein the UDP data playback time is configurable depending on system requirements and network conditions; and
- discontinue receipt of data from the media server and present the media content based on data received from at least one peer node without significant interruption in presentation;
- wherein while discontinuing receipt of data from the media server, the UDP communication mechanism is configured to terminate data transfer from the media server after the aggregate data rate of the data received from the peer nodes reaches a pre-determined level.

8. The system of claim 7, wherein the separate media clip is received from a node within the network.

9. The system of claim 7, wherein the separate media clip is stored locally.

10. The system of claim 7, wherein while discontinuing receipt of data from the media server, the second communication mechanism is configured to terminate data transfer from the media server after a given period of time has elapsed since the request is communicated to the media server.

* * * * *